INVENTOR
FREDERICK P. WILLCOX
BY
ATTORNEY

Oct. 31, 1950     F. P. WILLCOX     2,527,781
PRESS FOCUSING DEVICE FOR PHOTOGRAPHIC
SHUTTERS AND DIAPHRAGMS

Filed Jan. 24, 1948     3 Sheets-Sheet 2

INVENTOR
FREDERICK P. WILLCOX
BY
ATTORNEYS

Oct. 31, 1950     F. P. WILLCOX     2,527,781
PRESS FOCUSING DEVICE FOR PHOTOGRAPHIC
SHUTTERS AND DIAPHRAGMS

Filed Jan. 24, 1948     3 Sheets-Sheet 3

INVENTOR
FREDERICK P. WILLCOX
BY
ATTORNEYS

Patented Oct. 31, 1950

2,527,781

UNITED STATES PATENT OFFICE 2,527,781

PRESS FOCUSING DEVICE FOR PHOTOGRAPHIC SHUTTERS AND DIAPHRAGMS

Frederick P. Willcox, Bethesda, Md., assignor to General Aniline & Film Corporation, New York, N. Y., a corporation of Delaware Application January 24, 1948, Serial No. 4,114

6 Claims. (Cl. 95—63)

This invention relates to a mechanism for so-called "press focusing" with photographic cameras such as those in which the image is viewed through the taking lens on a ground glass.

Among the objects of the invention is that of devising a press focusing mechanism which may be operated for opening both the shutter blades and the diaphragm by a single actuating means and, therefore, with one hand only.

Another object of the invention is that of devising a press focusing device which shall be effective by a single actuating means for opening both the shutter blades and the diaphragm, and for returning the shutter blades to closed position and the diaphragm to any preselected relative aperture by releasing that single actuating or control element.

Another object of the invention is that of devising a press focusing mechanism which shall be easily applied to shutters of the symmetrically opening type where the diaphragm and blades are located at or between the lens elements and which shall be relatively simple and dependable and effective in its operation.

Other objects of the invention will become apparent from the following more detailed description.

There have been a number of press focusing devices described in prior patents and some have been employed commercially. However, most of these devices have been operated by two separate control members, one for the shutter blades and the other for the diaphragm or iris. Some shutters have means governing the return of the diaphragm to a predetermined position at which it may have been set prior to focusing on an object to be photographed.

Difficulties with the devices of the prior art arise from the fact that two separate manual operations are essential in that the shutter blades must be opened by a control therefor, and the diaphragm separately opened by the usual diaphragm setting means. After focusing, the photographer must take the necessary time and must remember to reset the diaphragm at whatever stop he has intended to use in addition to releasing the blades, that also requiring his attention toward two separate control elements at the shutter.

While there have been devices for limiting the return of the diaphragm to a particular stop, they have, insofar as applicant is aware, been a part only of the diaphragm mechanism and there has been no interconnection between the blade opening means and the diaphragm so that that single control may serve for opening both elements, and upon release thereof, shall also serve to return both the shutter and diaphragm blades to that position intended. According to the invention, a diaphragm blade control ring is set by means of a diaphragm setting ring, lever, or other setting member, which functions through means such as a gear train and which, by its frictional contact with appropriate restraining members in the shutter, limits the movement of the diaphragm control mechanism in the direction of closing down the iris. By a "pick-up" mechanism forming a part of the gear train and which is adapted positively to open the diaphragm, the focusing movement may be taken from a combined blade opening and diaphragm opening control lever.

A spring-urged sector gear meshes with a part of the gear train to open the diaphragm for focusing purposes and functions when released, due to spring tension applied to it, to close the diaphragm to that point permitted by the preset diaphragm control member which dominates. The "pick-up" mechanism always serves to stop the return of the diaphragm at the preset opening, but permits it to be opened by the press focusing lever without disturbing the main setting means.

After the shutter has first been cocked or set, the shutter blades themselves are opened with the diaphragm and are maintained in open position by an additional member which stops the blade actuating means after it has been released and when the blades have reached a fully opened position. When the diaphragm is released by the press focusing control member, that stop means which functions to retain the blade operating parts in an intermediate (blade open) position is withdrawn thereby to permit the blades to close.

The invention will be described in detail by reference to one preferred embodiment thereof as applied to an interlens shutter and by reference to the accompanying figures of drawing, wherein.

Figure 1:
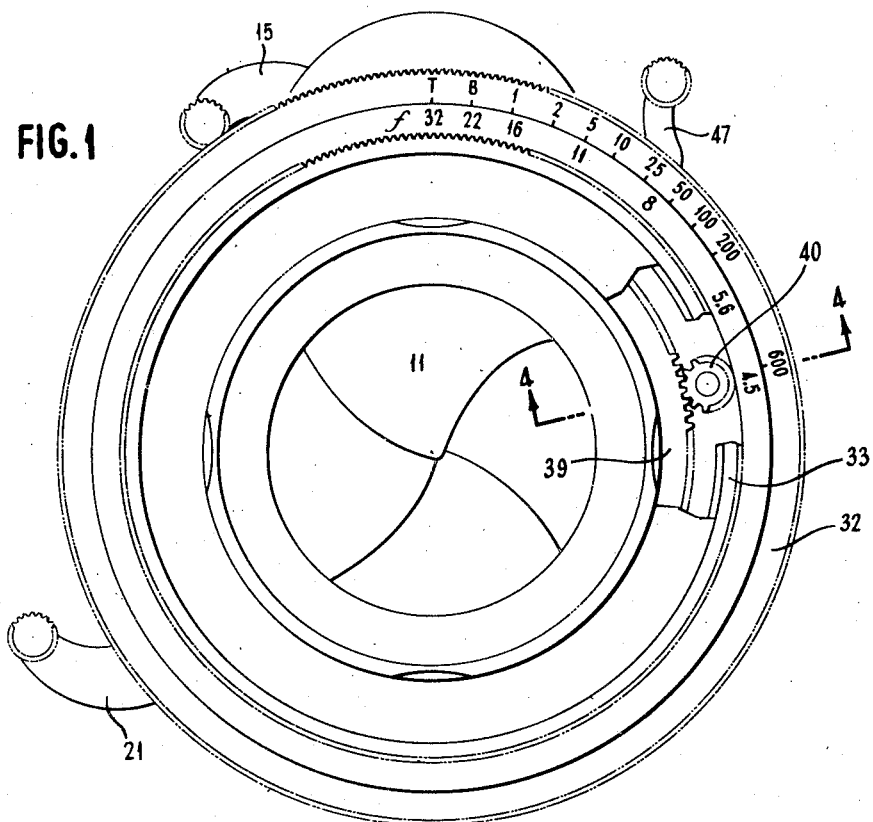
Fig. 1 is a front elevation of the assembled shutter, certain parts being broken away to show some of the diaphragm setting mechanism.
Figure 2:
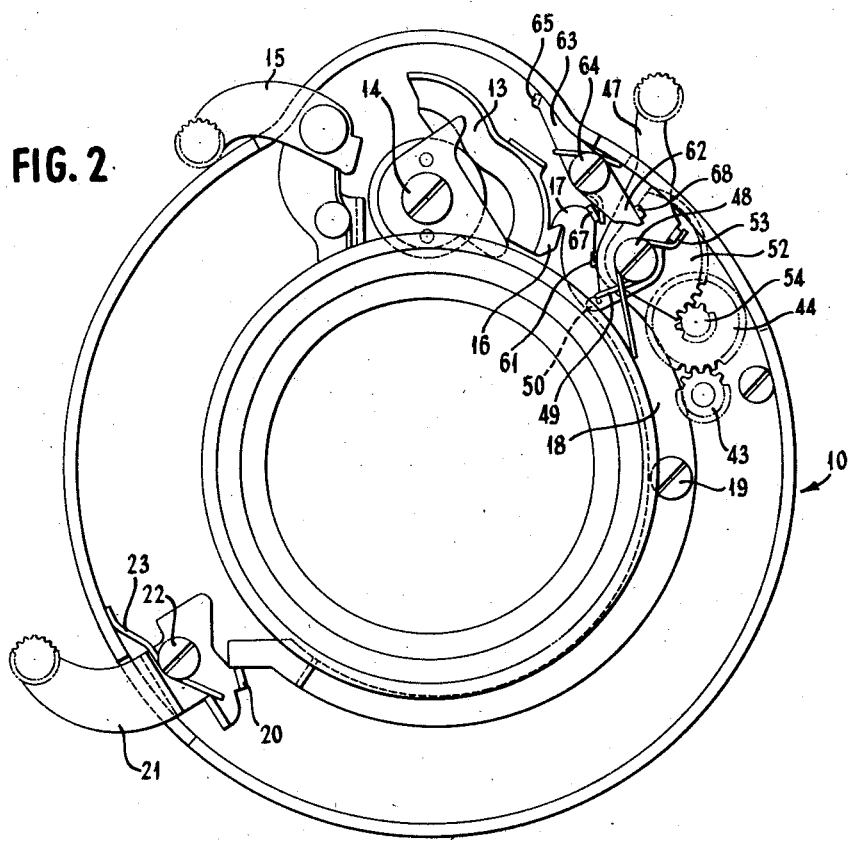
Fig. 2 is a view of the shutter with the front plates removed to show the press focusing mechanism and its relationship to the blade operating cam and release means therefor, the parts being shown in set position.

Now referring to Figs. 1 and 2, the invention has been illustrated in an interlens type shutter having symmetrically opening blades, this being a common type of shutter used with cameras in which so-called press focusing is practiced. The shutter includes, among other elements, a casing generally indicated by numeral 10 within which the usual lens is centrally retained and between the elements of which are positioned the shutter blades 11 and an iris diaphragm having a plurality of blades 12, Fig. 3. The said shutter also has for operating the blades 11 spring controlled mechanism comprising a cam 13 pivoted about a center 14 and which may be moved from an unset position to the set or cocked position of Fig. 2 by a setting lever 15.

The shutter operating cam 13 has a catch 16 which is engaged by a latch 17 at one end of an arcuate release member 18 pivoted at 19 and engaged at its other end by a lug 20 struck up from a portion of a trigger 21. The trigger is in turn pivoted at 22 and is held in the position of Fig. 2 by a spring 23 in a conventional manner. For a more detailed description of the mechanism and operation of the basic shutter to which the present mechanism is applied, reference is made to application Serial No. 737,277, filed March 26, 1947.

Figure 3:
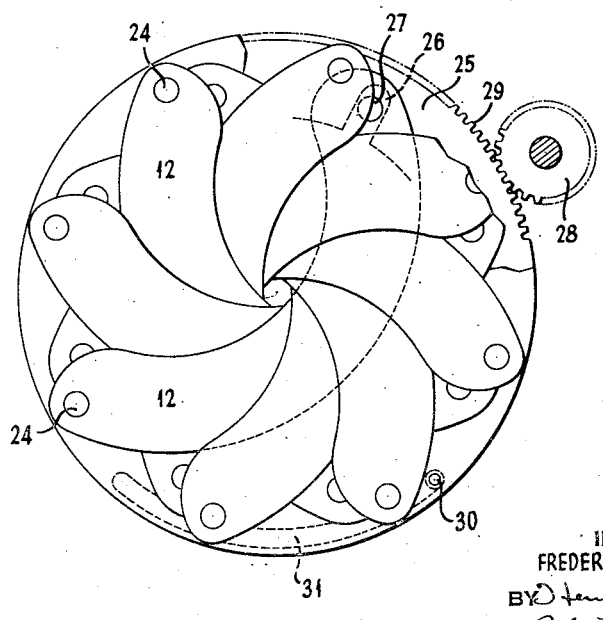
Fig. 3 is a detail view of the iris diaphragm itself.

Referring to Fig. 3, the diaphragm blades 12 are pivoted at one end upon pins 24 and at their other ends, are controlled by a diaphragm blade ring 25 having slots within which project pins 27 fixed to the free end of the said blades. The pins 24 are, of course, fixed in a relatively immovable part within the shutter casing and the ring 25 is adapted to be rotated throughout a predetermined arc by a gear 28 which meshes with teeth 29 cut at the surface of the ring. A pin 30 is fixed within the ring 25 and limits the movement thereof in either direction due to engagement with the ends of an arcuate slot 31.

This diaphragm mechanism itself is conventional although the operating means therefor is novel and is subject matter of copending application Serial No. 718,871, filed December 27, 1946, now abandoned, to which reference is made for a detailed description of the blade setting mechanism.

Figure 4:
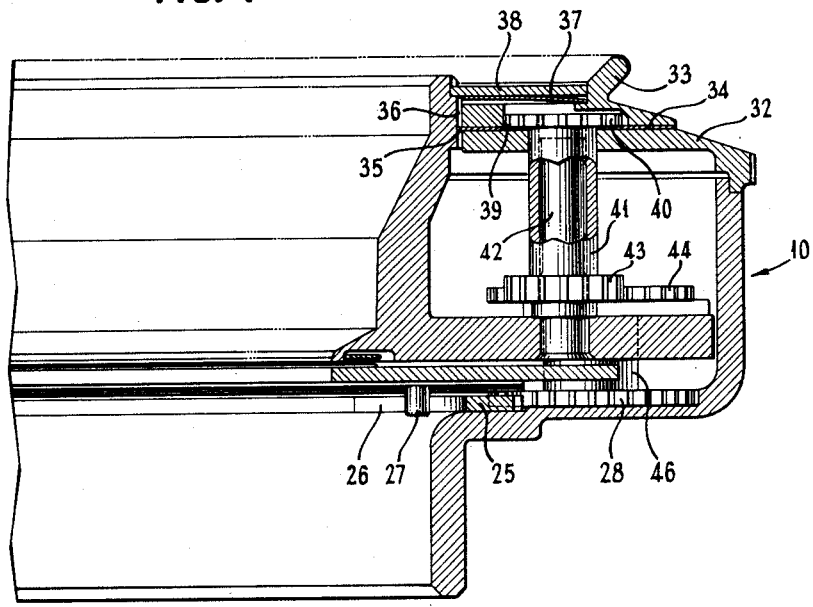
Fig. 4 is a section through part of the shutter taken at line 4—4, Fig. 1.

Now referring to Fig. 4, the casing generally designated by numeral 10 carries at the front portion thereof a shutter speed setting ring 32 having suitable cams therein (not shown) for controlling the speed of the shutter and a second ring 33 by which the diaphragm is set at any desired opening or aperture. The ring 32 is frictionally held in set position while the ring 33 is likewise frictionally maintained in position, the two being separated by a thin washer 34 which has a projection or projections 35 extending into complementary keyways or serrations 36 in the central portion of the shutter casing thereby to prevent rotation of the washer. The inner surface of ring 33 is pressed against washer 34 by means of a spring or similar washer 37 held in position by the front plate 38 of the shutter.

The speed setting ring 32 and ring 33 have graduations at the faces thereof as shown in Fig. 1. These graduations on ring 33 permit the iris to be set at relative openings in accordance with the designated numerals.

Figure 5:
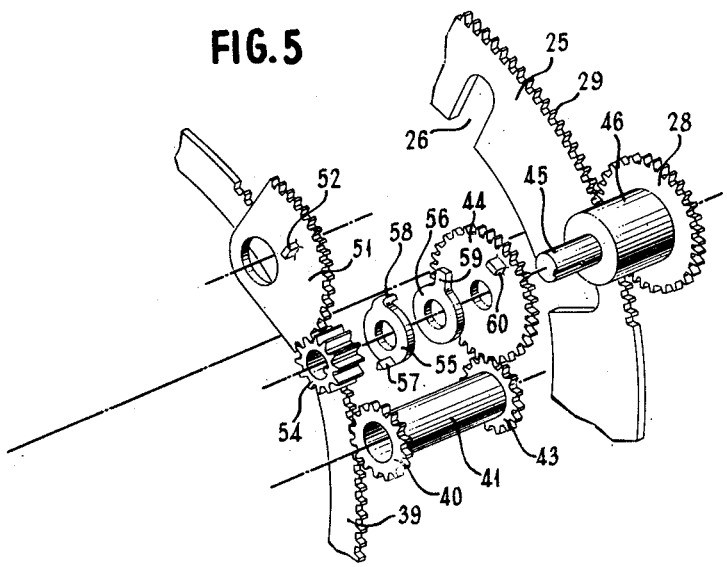
Fig. 5 is an exploded view of the gear train, iris blade control ring and part of the iris setting ring.

To operate the diaphragm, the ring 33 is rotated thereby rotating the diaphragm blade control ring 35 through a gear train shown in Figs. 4 and 5. The ring 33 has a toothed sector portion 39 which engages a pinion 40 at one end of a sleeve 41 mounted for rotation on a stud 42. Sleeve 41 has fixed at its other end a second pinion 43 which meshes with a gear 44 freely rotatable upon a reduced end 45 of a shaft 46 to which is fixed the gear 28 which meshes with the teeth 29 in the diaphragm blade control ring 25, Figs. 3, 4, and 5.

Figure 2A:
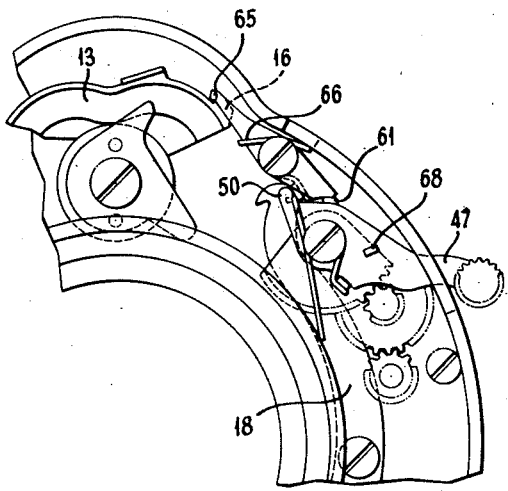
Fig. 2a is a view of the mechanism shown in Fig. 2, the parts being shown in the position they assume when the blades of both the shutter and the iris have been opened for focusing.

Now referring to Figs. 2, 2a and 5, the press focusing mechanism really comprises an extension to the diaphragm blade operating means which might otherwise have the gear 44 fixed to the shaft 46 so that, as disclosed in the application above mentioned, movements of the setting ring 33 would always bring about appropriate movements of the blades thereby to set them at any of the relative apertures within limits of which the device is designed to function. A press focusing lever or control member 47 is pivoted at 48 and is normally urged in a counter-clockwise direction about that pivot by a spring 49 coiled about the pivot 48 and engaging behind a small projection 50 at the inner end of the lever 47, a further function for which will be explained later.

A sector gear 51 is also pivoted about the same pivot screw 48 as the lever and has projecting therefrom a lug 52 engageable by the adjacent side of the lever 47. The sector gear is always urged in a counterclockwise direction (Fig. 2) about the pivot by means of spring 53. Gear 51 meshes with a small pinion 54 which is keyed to the end of the reduced portion of the shaft 46.

The pinion 54 has a "pick-up" connection with the freely rotatable gear 44 on the extension 45 which comprises special disks 55 and 56. The disk 55 has a lug 57 which engages between gear teeth on the pinion 54 and a second lug 58 which engages an extension 59 on the second disk 56. The extension 59 in turn engages against the laterally directed lug 60 extending from the side of the gear 44. The teeth on the pinion 54 are of greater length than those on the sector 51 to provide for engagement by the lug 57. The parts are properly assembled and timed so that the lug 57 may project between the correct pair of teeth on the pinion at the same time.

When the parts are assembled with the pinion fixed at the end of the extension 45, the disks 55 and 56 and the gear 44 are freely rotatable with respect to the gear 28 except as controlled by the various lugs and projections, the function of which will be explained hereinafter.

The setting ring 33 really serves as a means for positively opening the diaphragm blades and since it has a sufficient amount of frictional engagement with the adjacent parts at the shutter casing, it always limits the movement of the diaphragm members in a closing direction. It cannot positively move the blades to close them, that function being accomplished by the spring actuated sector gear 51 which, as before stated, always tends to close the blades although the setting ring 33 dominates so that the spring tensioned at the sector gear can only close the blades so far as the iris setting means will permit.

The movement of the lever 47 in a clockwise direction to the position of Fig. 2a causes the sector gear 51 to rotate the pinion 54 which, through the positively attached gear 28, turns the ring 25 until, at the extremity of movement for the parts, the diaphragm blades will be fully opened. Upon release of the said press focusing lever, the sector moves back under the influence of spring 53 thereby to close the blades to whatever relative opening has been previously set in accordance with the position of ring 33.

The gear 44 positively interconnected to the setting ring or segment 39 which forms a part thereof by the pinions 40, 43, and sleeve 41, serves as a stop for this return movement. During the clockwise rotation of sector gear 51, the disk 55 moves with the pinion and the lug 58 merely moves away from projection 59 and, in fact, after a complete revolution would again pick up that projection at its opposite side and may move it throughout almost a complete turn before it would again stop at the opposite side of the laterally projecting lug 60. This operation provides almost two free revolutions for the pinion 54 and gear 28 which is ample for moving the diaphragm blade control ring 25 throughout that angular extent necessary for control of the blades.

On the return movement of the parts, the sector gear 51 may rotate pinion 54 thereby closing the blades until the lug 58 engages projection 59 and that projection contacts laterally projecting lug 60 thereby stopping the parts at whatever preset iris opening has been chosen.

Now returning to Figs. 2 and 2a, the press focusing lever 47 has a first lug 61 which engages beneath one end 62 of a latch member 63 pivoted at 64. This latch member 63 has a laterally bent detent 65 which may engage the catch 16 on the cam 13 as illustrated in Fig. 2a. A spring 66 normally tends to hold the latch member in the position of Fig. 2 or its relatively inactive position. The end 62 of the lever is curved as illustrated so that after it has been swung to a position to stop the cam 13 after part of its travel, further movement of the lever 47 has no effect thereon.

The small extension 50 on the press focus lever engages beneath a lug 67 at the hooked end of the release lever 18 and removes the latch 17 from the catch 16 thereby releasing the shutter operating cam to open the blades. The blade movement, however, progresses only so far as permitted by the latch member 63, i. e., far enough to open the blades completely.

The timing of the parts is such that as the lever 47 is swung from relatively inactive position to its complete limit of travel, Fig. 2a, the lug 61 first engages beneath the end 62 of the latching lever to raise it and move the other end down to a position in which the lug 65 stands in the pathway of the catch 16. Then the projection 50 withdraws the latch 60 thereby permitting its cam to make its upward movement. Depending upon the setting of the diaphragm the lever 47 picks up lug 52 on the sector gear at some point in its travel and through the mechanism above described and illustrated in Fig. 5, opens the diaphragm blades to their fullest extent.

Return or release of the lever 47 permits the spring 53 to return the sector gear as far as it will go thereby to return the diaphragm blades to whatever stop the diaphragm setting ring has been preset. Then, upon engagement of a second lug 68 on the lever 47 upon the top of the end 62 of lever 63, that lever is so swung away from the position of Fig. 2a that the cam 13 is released and permitted to return to its initial or unset position. That closes the shutter blades. The spring 66 may normally be relied upon to hold the latching lever 63 in its inactive position, but lug 68 by contact with the lever positively withdraws the detent 65 so that that function is not dependent upon a spring. After releasing the press focus lever 47, the shutter may again be set and the picture taken.

Operation

To sum up the operation of the device, it may be assumed that it is desired to focus upon some particular object and that the shutter is not in cocked position. The shutter is first set so that the cam 13 takes the position shown in Fig. 2. Then the press focus lever 47 is pushed over toward the right to the position of Fig. 2a, whereupon the sector gear 51 is picked up by the lever sooner or later depending upon the setting of the diaphragm which, let us assume, is set at f-8. At that setting the lever 47 may be moved about half way of its complete travel before it picks up the sector gear.

Rotation of the sector gear as the lever is moved to the end of its travel causes the diaphragm blades to be completely opened, since the sector rotates pinion 54 and gear 28, rotatable therewith, moves the diaphragm blade control ring 25 to the end of its travel in a direction for opening the blades.

During the swinging of lever 47 from one extreme position to the other, lug 61 thereon engages beneath the end 62 of the latching lever and moves the detent 65 to a position in which it will engage catch 16 on the cam 13 after the cam has been released. The timing is such that detent 65 is moved to a position slightly in advance of contact between the projection 50 and lug 67 on the release lever 18. The last few degrees of movement of the press focusing lever causes latch 17 to withdraw from the catch 16 thereby permitting the cam 13 to move to the position of Fig. 2a where it is stopped by the latching lever and in which position it will have moved the shutter blades until they are fully opened.

The press focusing lever 47 is held in the position of Fig. 2a as long as it is desired to view the image on the ground glass and, when focusing has been completed, the lever may be released whereupon the spring tension thereon immediately moves it back to its initial or inactive position. The lug 68 strikes against the top of the end 62 of the latching lever withdrawing detent 65 and permitting the cam 13 to complete its travel and to close the shutter blades. The sector gear 51 under the influence of its tension spring moves back or in a counterclockwise direction, rotating pinion 64 and gear 28 to close down the iris until the lug 58 becomes engaged with extension 59 which will, in turn, bear against the projection 60 on the gear 44. Contact of those parts stops the closing movement of the diaphragm blades and that occurs at whatever point the ring 33 has been set, e. g., at f-8 as above assumed.

To take the picture, it is then necessary to recock the shutter, insert the film holder and withdraw the slide as is the usual practice. The device is virtually fool-proof since only one control means, lever 47, is employed. One cannot see the image to focus unless the shutter has first been cocked and unless the lever 47 is pushed downwardly nearly to its fullest extent thereby to open not only the diaphragm, but also the shutter blades. Upon release of the lever, it must return to its initial position and that return movement is almost immediately accompanied by release of the shutter blades which move to their closed position and an automatic closing down of the diaphragm to whatever stop it had previously been set. There is no possibility of taking the photograph with the diaphragm shaft completely open unless that setting has been intended and the ring 33 accordingly positioned.

Focusing is normally taken care of by turning a focusing knob or moving some similar control with the right hand while the press focus lever 47 is held down with the left hand. After the image has been brought into focus and the picture properly composed on the ground glass, the release of the press focusing lever is all that is necessary to return the parts to proper position after which the photographer may take the picture by placing the film or plate as is the usual practice and thereupon cocking the shutter and releasing it in the usual manner.

If the camera to which this mechanism is applied is one of the type known as a single lens reflex, the film may be positioned in readiness for having the latent image impressed thereon, and it is only necessary after focusing, to release the press focus lever, set the shutter, and then to release it in the usual manner for taking the photograph.

While the invention has been described as applied to a particular interlens shutter, it is to be understood that the description is illustrative of one embodiment the invention may take and that the principles of the invention may be applied to virtually all interlens shutters or similar shutters having diaphragms and that the shutter operating mechanism may comprise elements other than or different from the cam 13, for example, an oscillatory disk or other member desired to impart movement through a connecting link or the like. In that event, the latching member is merely modified so as to restrain the parts in that position necessary to hold the shutter blades in open position after release while the diaphragm may still be controlled in a manner similar to that described in this case.

In cameras having focal plane shutters only, the lens is provided with a diaphragm, but no shutter. In these situations the mechanism for opening the iris and for closing it back down to the preset opening is advantageously employed. The lever 47 need only affect the sector gear.

In some instances, it may be desirable to hold the blades in open position without keeping the hand on the press focus lever. If so, there may be enough frictional contact between the lug 61 and the curved end of the lever arm 62 so that the lever 47 will return only if moved counterclockwise positively.

Alternatively, a latch means may be provided outside the shutter casing and may be used only when it is desired to dispense with the feature of automatic return upon release of the lever 47. These permit the blades to be held open while both hands are kept free for manipulating other parts.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. For a photographic shutter having symmetrically opening shutter blades, a centrally opening diaphragm and shutter blade actuating means including a master member, a press focusing device comprising a gear train interconnecting a diaphragm blade control ring and a diaphragm setting member, said train having therein a pick-up connection permitting opening of the diaphragm blades without corresponding movement of the setting member, and functioning positively to convey movement of the setting member through to the said diaphragm blades in a direction for opening them, a press focus control member and a means functioning upon movement thereof to release the said master member after it has been tensioned and to retain it in a blade open position, other means functioning from said control member for rotating a part of said gear train to open the diaphragm blades, said means being resiliently urged to return the diaphragm blades to a position determined by the setting of the remainder of the train and the pick-up connection, and simultaneously to release the master member.

2. For a photographic shutter having symmetrically opening shutter blades, a centrally opening diaphragm and shutter blade actuating means including a master member, a press focusing device comprising a gear train interconnecting a diaphragm blade control ring and a diaphragm setting member, said train having therein a pick-up connection permitting opening of the diaphragm blades without corresponding movement of the setting member, said pick-up connection functioning positively to convey movement of the setting member through to the said diaphragm blades in a direction for opening them, a press focusing lever and a toothed member meshing with a pinion forming a part of said gear train and movable by said lever for imparting movement thereof to the train, and other means movable with said lever for releasing said master member after it has been tensioned and for retaining it in a blade open position, and means operable upon return of said press focusing lever to its initial position for releasing the master member to close the shutter blades, and resilient means for urging said toothed member in a direction for returning the diaphragm to a position determined by the setting of the gear train as controlled by the diaphragm setting member.

3. For a photographic shutter having symmetrically opening shutter blades, a centrally opening diaphragm and shutter blade actuating means including a master member, a press focusing device comprising a gear train interconnecting a diaphragm control ring and a diaphragm setting member, said train having therein, a pick-up connection functioning positively to convey movement of the setting member through to the said diaphragm blades in a direction for opening them, but permitting opening of the diaphragm blades without corresponding movement of the setting member, a press focusing control member and means functioning upon movement of said member to release the said master member after it has been tensioned, a latch member movable by said control member for stopping the movement of said master member in a position for maintaining the shutter blades open, and a spring urged sector gear meshing with a pinion forming a part of said gear train for rotating that train as permitted by the pick-up mechanism in a direction for opening the diaphragm blades, and means for moving said sector gear as the press focusing control member is moved to open the shutter blades, said sector gear being effective under influence of its spring, for returning the diaphragm to a position as governed by the diaphragm setting member upon release of the press focusing member.

4. For a photographic shutter having symmetrically opening shutter blades, a centrally opening diaphragm and shutter blade actuating means including a master member, a press focusing device comprising a gear train interconnecting a diaphragm control ring and a diaphragm setting member, said train comprising intermeshing gears on two shafts, an intermediate one of said gears being freely rotatable on its shaft, a pinion fixed to that shaft on which said intermediate gear is freely rotatable and a pick-up connection between said pinion and freely rotatable gear, said pick-up connection functioning positively to convey movement of the setting member through the said freely rotatable gear and the pinion to the said diaphragm blades in a direction for opening them, but permitting opening of the diaphragm blades without corresponding movement of the setting member, a press focusing control lever and means functioning upon movement of said lever to release the said master member after it has been tensioned, a latch member movable by said control member for stopping the movement of said master member in a position for maintaining the shutter blades open, and a spring urged sector gear meshing with a pinion forming a part of said gear train for rotating that train as permitted by the pick-up mechanism in a direction for opening the diaphragm blades, and means for moving said sector gear as the press focusing control lever is moved to open the shutter blades, said sector gear being effective under influence of its spring, for returning the diaphragm to a position as governed by the diaphragm setting member upon release of the press focusing member.

5. For a photographic shutter having symmetrically opening shutter blades, a centrally opening diaphragm and shutter blade actuating means including a master member, a press focusing device comprising a gear train interconnecting a diaphragm control ring and a diaphragm setting member, said train comprising intermeshing gears mounted on two shafts, said gears including a freely rotatable intermediate gear carried by one said shaft, and a pinion fixed to that shaft adjacent said freely rotatable gear and a pick-up connecting means functioning to impart movement from said freely rotatable gear to said pinion in one direction of movement, but permitting movement of the pinion for effecting the position of the diaphragm without corresponding movement of said freely rotatable gear and diaphragm setting member, a press focusing lever pivoted adjacent said gear train and a sector gear movable in one direction by said lever and spring urged in the opposite direction, said sector gear having meshing engagement with the said pinion, a latch member and means forming a part of said lever for moving said latching means to a position for engaging and stopping the master member to retain the shutter blades in an open position, other means forming a part of said lever for releasing said master member after it has been locked in set position, and interconnecting means between said press focusing lever and sector gear effective upon movement of the lever to rotate the sector gear and thereby the pinion and that part of the train controlled thereby for opening the diaphragm, said press focusing lever permitting return of the sector gear upon movement of the lever to its original position thereby to rotate the train as far as permitted by the pick-up connection, freely rotatable gear and diaphragm setting member to close the diaphragm, said lever having means thereon for withdrawing the latch member thereby to release the master member and permit it to close the shutter blades.

6. For a photographic shutter having symmetrically opening shutter blades, a centrally opening diaphragm and shutter blade actuating means including a master member, a press focusing device comprising a gear train interconnecting a diaphragm control ring and a diaphragm setting member, said train having therein, a pick-up connection functioning positively to convey movement of the setting member through to the said diaphragm blades in a direction for opening them, but permitting opening of the diaphragm blades without corresponding movement of the setting member, a press focusing control member, a pivot therefor, and means functioning upon movement of said member to release the said master member after it has been tensioned, a latch member movable by said control lever in advance of the release of said master member for stopping the master member in a position for maintaining the shutter blades open, a spring urged sector gear mounted on said lever pivoted and meshing with a pinion forming a part of said gear train for rotating that train as permitted by the pick-up mechanism in a direction for opening the diaphragm blades, and means projecting from said lever and engaging said sector gear for moving the gear against spring tension exerted thereon as the press focus lever is moved to open the said shutter blades, said sector gear being effective upon return of the press focusing lever to inactive position and under influence of its tension spring, for returning the diaphragm to a position as governed by the diaphragm setting member.

FREDERICK P. WILLCOX.

REFERENCES CITED

The following references are of record in the file of this patent:

UNITED STATES PATENTS

| Number | Name | Date |
| --- | --- | --- |
| 2,222,298 | Nerwin | Nov. 19, 1940 |
| 2,269,401 | Steiner | Jan. 6, 1942 |
| 2,333,820 | Riddell | Nov. 9, 1943 |
| 2,362,547 | Fuerst | Nov. 14, 1944 |